Figure 1:
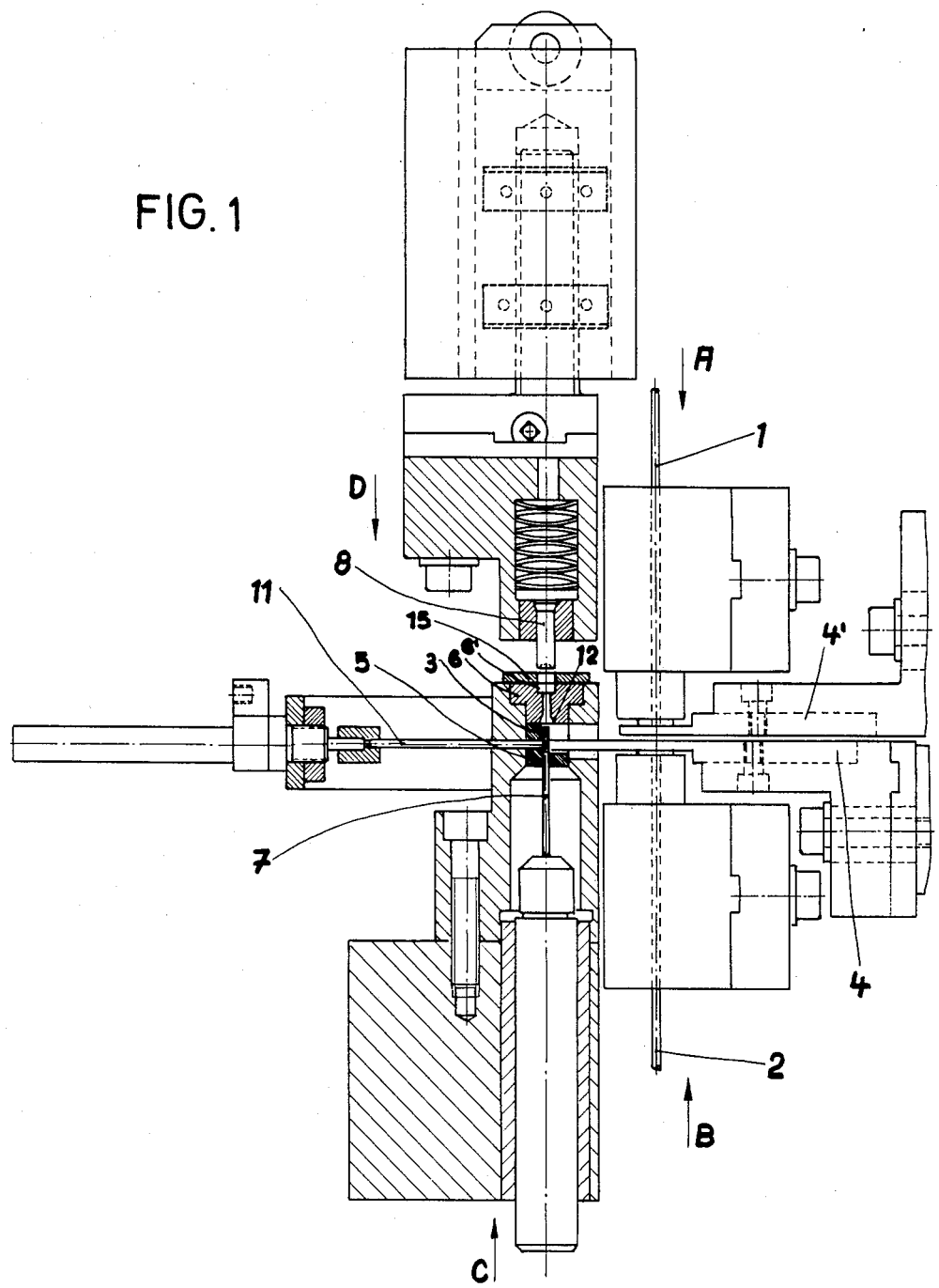

United States Patent [19]

Wacker

[11] Patent Number: 4,716,268
[45] Date of Patent: Dec. 29, 1987

[54] METHOD AND APPARATUS FOR PRODUCING BIMETALLIC CONTACTS, ESPECIALLY BIMETALLIC WELDED CONTACTS

[75] Inventor: Hans Wacker, Heidelberg, Fed. Rep. of Germany

[73] Assignee: Renz, Wacker & Co. Maschinenfabrik, Wildbad im Schwarzwald, Fed. Rep. of Germany

[21] Appl. No.: 266,512

[22] Filed: May 22, 1981

[30] Foreign Application Priority Data

May 27, 1980 [DE] Fed. Rep. of Germany ....... 3020144

[51] Int. Cl.$^4$ .............................................. B23K 11/16
[52] U.S. Cl. ...................................... 219/118; 219/79; 228/5.1; 228/265
[58] Field of Search .................. 219/118, 78.15, 78.16, 219/103, 79; 72/337, 339, 346; 10/12 T; 228/3.1, 5.1, 115, 116, 265; 29/874

[56] References Cited

U.S. PATENT DOCUMENTS 3,514,574 5/1970 Forschler ............................ 219/103
3,547,334 12/1970 Gwyn ............................ 228/5.1 X

FOREIGN PATENT DOCUMENTS 1014826 12/1965 United Kingdom ................ 219/118

Primary Examiner—B. A. Reynolds
Assistant Examiner—Catherine M. Sigda
Attorney, Agent, or Firm—Max Fogiel

[57] ABSTRACT

An arrangement for bimetallic contacts, especially bimetallic welded contacts, in which wires of metals having different conductivity, e.g. silver and iron, are butt-welded with one another by electrical resistance welding without noticeable deformation of the connecting point. The wires are then sheared off at both sides of the connecting point. The bimetallic pins are formed by cold-pressing to the final bimetallic contacts whose head cross-sections are larger than the possibly different cross-sections of the wires for the manufacture.

3 Claims, 8 Drawing Figures

METHOD AND APPARATUS FOR PRODUCING BIMETALLIC CONTACTS, ESPECIALLY BIMETALLIC WELDED CONTACTS

The invention relates to a method of producing bimetallic contacts, especially bimetallic welded contacts, in which wires of metals having different conductivity, e.g. silver and iron, are butt-welded with one another by electrical resistance welding without noticeable deformation of the connecting point, then sheared off at both sides of the connecting point, and wherein finally the bimetallic pins obtained by shearing-off of the wire components are formed by cold-pressing to the final bimetallic contacts whose head crosssections are larger than the possibly different cross-sections of the wires for the manufacture, and also to an apparatus for carrying out such a manufacturing method.

In the manufacture of bimetallic contacts it is already known to butt-weld the end faces of metallic wires having the strongest possible difference in conductivity and possibly also different cross-sections, then to separate the connection from the wire components and to deform the thus obtained bimetal pins into a bimetal contact, but these are bimetal contacts with rivet shafts.

In the heretofore known apparatus for making such bimetal contacts two shear blades serve for shearing the wire components of both sides of the connection created by buttwelding from the wire components, of which the one is constructed as a transport blade and subsequently to shearing brings the obtained bimetal pin before the base of an upsetting matrix where the bimetal pin is engaged by a pre-upsetting stamp, inserted into the upsetting matrix and then deformed into the finished bimetal contact. A prerequisite of this method is that the bimetal pins sheared off from the wire components joined by butt-welding must have a certain length, as required for the making of bimetal contacts with rivet shafts.

Using the above described technology, welding contacts could not heretofore be produced because due to the lack of rivet shafts the wire components would have had to be severed relatively closely to the welding point and the thus obtained bimetal pins—due to the extremely short wire sections at opposite sides of the connection point—could not have been positionally correctly supplied to a subsequent upsetting matrix. The further reason was that with such short wire sections the two shear blades would have become too weak and that thus during shearing of the wire components there was the danger of a yielding of the blades, with the result that cuts extending absolutely at right angles to the wire elongation could not be made. Straight cuts are, however, necessary for the subsequent butt-weldings of the two wire components. Also, problems arose with such short bimetal pins in connection with their proper insertion into the recess of an upsetting matrix by means of a stamp.

Therefore, rivet-shaft-less bimetal contacts heretofore have been made of strip-plated band material by stamping out circles which has, however, been found to be extremely costly due to the inevitable scrap losses of band material. Such strip-plated band material has, as a rule, a noble metal coating which in the interest of recovery must be separated in expensive manner from the base material.

In view of this state of the art the invention aims to provide a method which is improved especially with respect to the material expenditure and the manufacturing costs and an apparatus serving to carry out the invention for the production of rivet-shaft-less bimetal contacts, especially welding contacts.

Starting from the realization that the scrap increasing the cost of the conventional manufacture of rivet-shaft-less bimetal contacts can be avoided only if it is possible to use wires as starting material which can be butt-welded at their end faces, the solution of the invention in method terms resides in that in a method of the type mentioned at the beginning the bimetal pins are severed from the wire components with relatively short wire sections at both sides of the connecting point, then formed into blanks in a first upsetting operation, whereupon the blanks are finished-pressed in a second operation to rivet-shaft-less bimetal contacts. The bimetal pins are supplied to the first upsetting operation, and the blanks obtained in the same are supplied to the second upsetting operation, in the positions in which they came from the respectively preceding operation.

It has been found advantageous if simultaneously and essentially in time a bimetal pin is obtained in a first working station by welding of two wires of different materials and subsequent severing of the wire components close to the connecting point, while in a second working station deformation of such a bimetal pin produces a blank, and in a third station such a blank is converted into a finished bimetal contact by cold pressing.

Due to the use of commercial wires as starting material the inventive method thus assures an economical manufacture of rivet-shaft-less bimetal contacts, especially bimetal welding contacts.

The solution of the inventive task set in apparatus terms is characterized by a welding and severing station to butt-weld wires which are brought in contact with their end faces and to produce bimetal pins by shearing off the wire components at both sides of the connecting point, by a pre-upsetting station for deforming the bimetal pins into blanks, and by a finish-upsetting station for deforming the blanks into finished bimetal contacts; further in that a device is provided for engaging the bimetal pins in the welding and severing station after shearing-off of the wire component and for subsequent supply to the pre-upsetting station under maintenance of the position given by the welding and severing station; further a device for transferring the blanks into the finish-upsetting station under maintenance of the position in which they came from the pre-upsetting station, the transfer devices operating in time with one another as well as with the welding and severing station and with the forming tools of the upsetting station.

Thus, one embodiment of the inventive apparatus is characterized in that the upsetting stations are each composed of an upsetting matrix with a central recess, a form stamp which is insertable into this recess during upsetting, and an upsetting needle, the upsetting needle being axially movably accommodated in guide bores which extend coaxially to the form stamps through the upsetting matrices. In such an apparatus it is advantageous if during the upsetting the form stamps close the workpiece-receiving recesses of the upsetting matrix at the sides remote from the upsetting needles and the upsetting needles are movable in direction towards the form stamps at simultaneous deformation of the workpieces, so that the deformation processes in the two upsetting stations are actively carried out by the movable upsetting needles against the form stamps which are constructed as supports. The form stamp of the pre-upsetting station may be elastically yieldably supported in a rear-sidedly arranged spring package and may yield axially to a limited extent under the influence of the upsetting force caused by the pre-upsetting needle which produces a flowing effect in the workpiece.

According to another important feature of the invention a guide rail is arranged at the side of the upsetting matrices facing towards the form stamps, as a supply device for the transfer of the blanks from the pre-upsetting station to the finish-upsetting station, which guide is provided with through bores which register with the recesses in the upsetting matrices and through which during upsetting the form stamps engage the workpieces received in the recesses, the guide rail being movable to and fro in strokes equal to the spacing between the upsetting stations, in such a manner that during each movement towards the finish-upsetting matrix a blank lifted out of the recess of the pre-upsetting matrix is entrained via the recess of the finish-upsetting matrix in the bore penetrated during upsetting by the pre-upsetting form stamp, and is thus introduced into the finish-upsetting matrix.

According to a further important feature the device for engaging the bimetal pins in the welding and severing station and for the subsequent supply of these bimetal pins to the pre-upsetting station, includes a transport blade and a therewith cooperating transversely movable rod which engage the bimetal pins between them and bring them on the side of the pre-upsetting matrix which is remote from the form stamp into a position between the guide bore extending through the pre-upsetting matrix and the pre-upsetting needle which is at that time withdrawn from the same, whereupon the pre-upsetting needle advances and inserts the respectively supplied bimetal pins through the guide bore into the recess of the pre-upsetting matrix for subsequent conversion into a blank. It is advantageous to arrange at the side of the pre-upsetting matrix remote from the form stamp a sleeve with a recess in which the bimetal pins are inserted exactly centrically relative to the guide bore in the pre-upsetting matrix via the transport blade and the therewith cooperating rod, so as then to be inserted through the guide bore in the pre-upsetting matrix into the latter, respectively the recess thereof, by the pre-upsetting stamp which advances from its retracted position, and finally to be converted into blanks under the influence of the further advancing pre-upsetting stamp in cooperation with the form stamp constructed as a counter support which, when elastically yieldably supported via a spring package, yields axially to a limited extent under the pressing force of the pre-upsetting needle.

Figure 2:
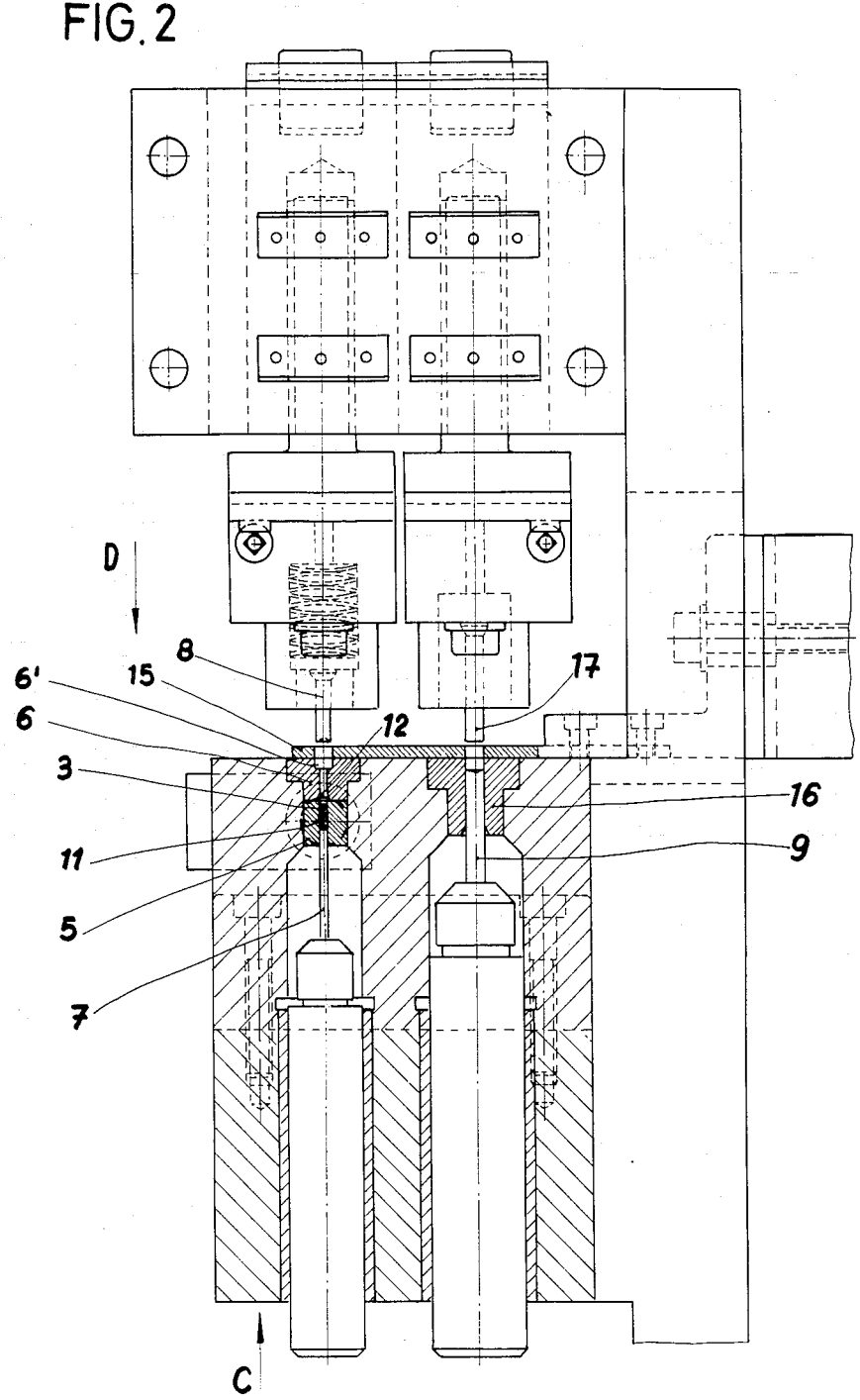
Figure 3:
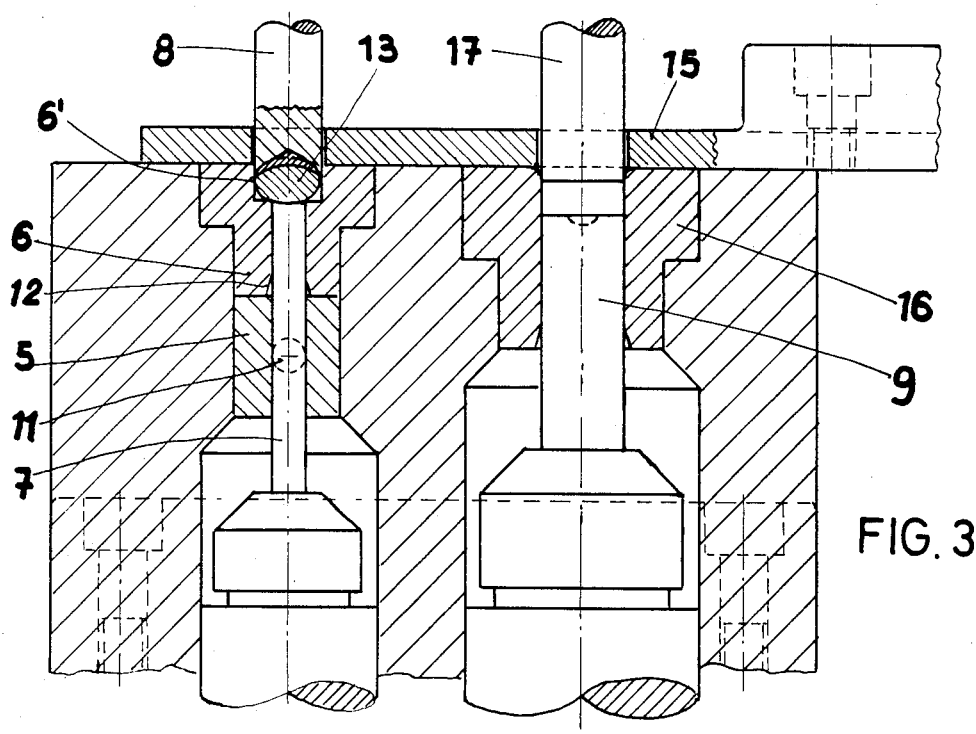
Figure 4:
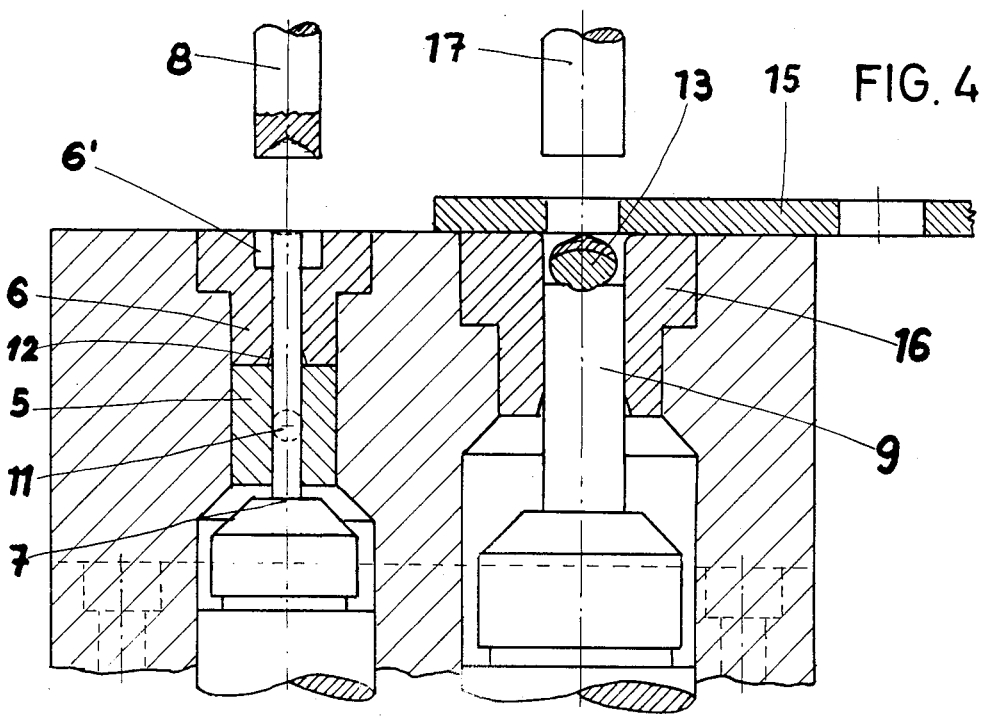
Figure 5:
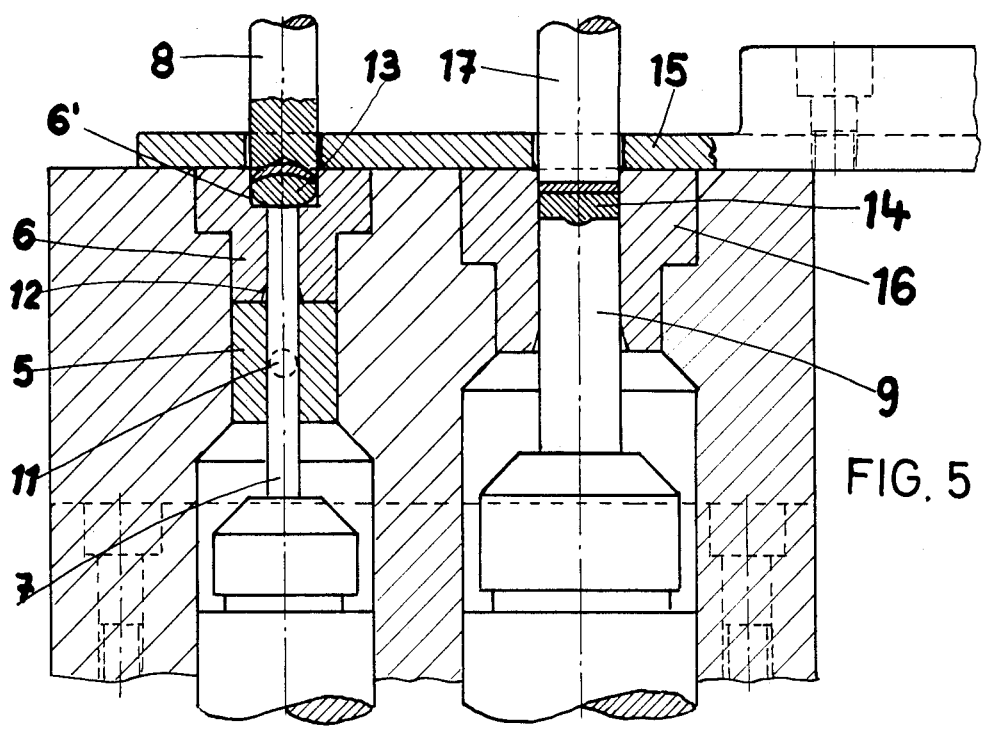
Figure 6:
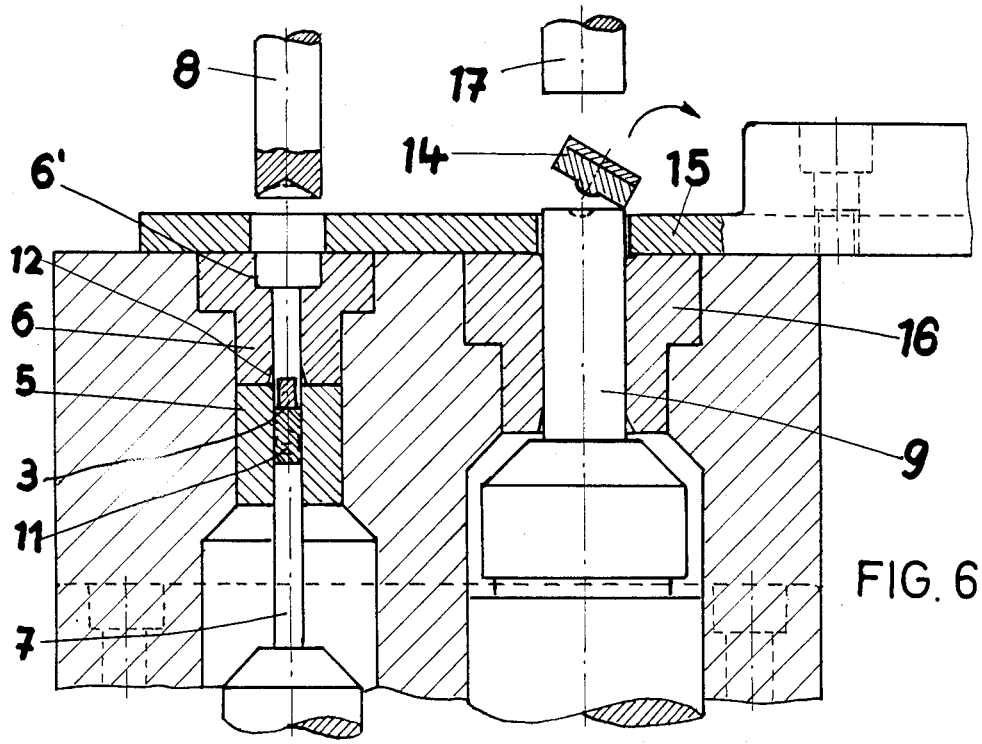
Figure 7:
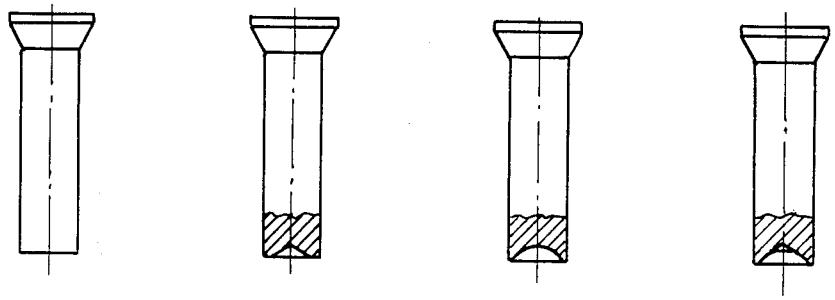
Figure 8:
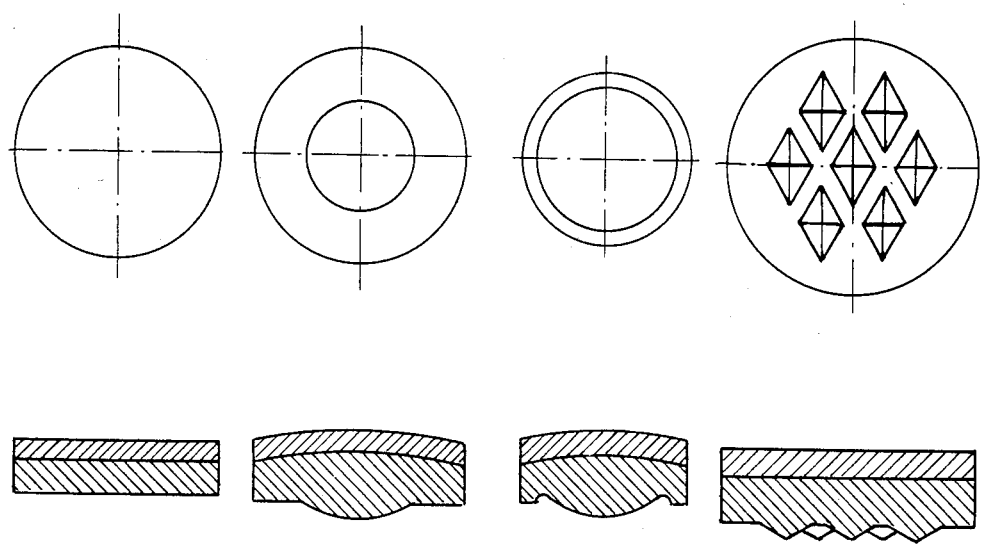

An embodiment of the inventive apparatus and the method are illustrated in the drawing in different operating steps. All in diagrammatic views, the Figures show:

FIG. 1—a top plan view of the apparatus with a bimetal pin prior to insertion into the pre-upsetting matrix, partly in section;

FIG. 2—a side view of the apparatus, also partly in section;

FIG. 3—an enlarged fragmentary detail view from FIG. 2, showing the upsetting stations alone with a blank produced in the pre-upsetting station;

FIG. 4—in a view similar to FIG. 3 the blank produced in the pre-upsetting station after its transfer into the finish upsetting station;

FIG. 5—the upsetting station after a further operating step, in which the blank transferred in FIG. 4 into the finish-upsetting station has been converted to a finished bimetal contact and simultaneously a new blank has been produced in the pre-upsetting station;

FIG. 6—an operating step of the upsetting station, in which a finish-pressed bimetal contact is ejected from the finish-upsetting station and a bimetal pin is supplied to the pre-upsetting station as starting material for a blank to be produced in this station;

FIG. 7—different embodiments of pre-upsetting stamps in enlarged-scale views, partly in section; and FIG. 8—top plan views and sectional views of different embodiments of welding contacts, also on a strongly enlarged scale.

In the apparatus of FIGS. 1 and 2 a wire 1 of e.g. silver is advanced in direction of the arrow "A" until its end face meets at a predetermined location with the end face of a wire of e.g. iron which is advanced in direction of the arrow "B". Thereupon the wire 2 is prestressed until a surface pressure is reached which suffices for subsequent electric resistance welding, whereafter the two wires which are pressed together with their end faces are butt-welded in known manner, utilizing a welding transformer which is here not of further interest and provided with an appropriate control.

After the welding, shear blades 4, 4′ sever the two wires 1, 2 at both sides of the butt-welding location from the same at predetermined distances, a thereby obtained bimetal pin being held by a pressure-loaded transversely movable rod 11 against the blade 4 which is constructed as a transport blade. In case of extremely short wire sections the cutting operation can be carried out with only one blade. After severing, the bimetal pin is transported into the recess of a metallic sleeve 5, directly in front of a bore in a pre-upsetting matrix 6 of the pre-upsetting station, via the transport blade 4 in cooperation with the transversely movable rod 11. In this position the bimetal pin 3 is inserted via an advancing and pre-upsetting needle 7 in arrow direction "C" and via a funnel-shaped inlet 12 into the pre-upsetting matrix 6 and advanced in the same to a recess 6′. There the e.g. silver-wire side of the welded bimetal pin 3 contacts the end face of the form stamp 8 which is inserted in arrow direction "D" through a bore in a closed guide rail 15 into the recess 6, the diameter of stamp 8 being somewhat smaller than the diameter of the recess 6′ in the pre-upsetting matrix 6. A continuous movement of pre-upsetting needle 7 in arrow direction against the form stamp 8 which in the same direction yields against a strong spring support, causing a flow-pressing effect, results in deformation of the wire volume of the bimetal pin to a blank, about like the shape shown in FIGS. 3 and 4.

The form stamp 8 of the pre-upsetting station may on its end face be flat or be provided with an obtuse-angled, arched or hemispherical recess which is shaped according to the requirements and quality demands relative to the strength and uniform distribution of the e.g. noble metal coating over the surface of the bimetal contact, in dependence upon the flow characteristics of the wires of noble metal or appropriate alloys used for formation of such a coating.

After the pre-upsetting is completed the form stamp 8 returns to its starting position and, as suggested in FIG. 4, the blank 13 is transferred to a finish-upsetting matrix 16 and is thereby brought into the effective range of a form stamp 17 which, like the form stamp 8 of the pre-upsetting station, is passed through the closed guide rail 15 and then closes the recess in the finish-upsetting station on the side remote from the upsetting needle 9. By operation of the finish-upsetting needle 9 upon the blank received in the recess of the finish-upsetting matrix 16, the blank is converted into a finished bimetal contact 14, as shown in FIG. 5.

At the beginning of the first deformation into a blank 13 a finish-upsetting operation does not yet take place, because at that time no blank 13 is in the finish-upsetting matrix 16. After upsetting of a first blank 13 in the pre-upsetting matrix 6 the blank is lifted—after raising of the form stamp 8—via the pre-upsetting needle 7 into the through bore in the guide rail 15 and is then supplied to the recess of the finish-upsetting matrix 16 by shifting of the guide rail in direction towards the finish-upsetting station; in the recess the blank comes to rest on the finish-upsetting needle 9. Thereafter the guide rail 15 returns from the position in FIG. 4 to its starting position according to FIG. 3, in which the through bores of the guide rail are aligned with the recesses in the two upsetting matrices.

During the supply of a blank 13 to the finish-upsetting matrix 16 a new bimetal pin is supplied into the recess of the metallic sleeve 5 due to cooperation of the transport blade 4 with the transversely movable rod 11, and is located directly ahead of the guide bore in the pre-upsetting matrix 6, to be advanced from this position via the pre-upsetting needle 7 to the recess 6' where the side of the bimetal pin formed from the material of the wire 1 contacts the end face of the form stamp 8 which is introduced through the bore in the guide rail into the recess 6' in direction of the arrow "D". During further advancement of the pre-upsetting needle 7 in direction towards the form stamp 8 the deformation of the welded bimetal pin 3 into the blank 13 takes place. Simultaneously with this upsetting step the blank resting on the finish-upsetting needle 9 and accommodated in the recess of the finish-upsetting matrix 16 is deformed into the final bimetal contact 14, by cooperation with the form stamp 17 closing the recess of the finish-upsetting matrix.

FIGS. 1 and 6 show the supply of the bimetal pin to the pre-upsetting station and the insertion into the recess of the pre-upsetting matrix 6; FIG. 5 shows the upsetting of the bimetal pin to a blank 13 and the deformation of the blank into a bimetal contact 14.

After the above explained upsetting operation the form stamps 8 and 17 return into their starting position shown approximately in FIG. 4. At the same time the finish-upsetting needle 9 ejects the finished bimetal contact 14 from below through the associated through bore in the guide rail 15 (as indicated in FIG. 6) and the blank formed in the pre-upsetting station is lifted via the appropriately advancing pre-upsetting needle 7 into the range of that through bore in guide rail 15 which is above the recess 6'. After the retraction of the pre-upsetting needle 7 the guide rail transports the blank to the finish-upsetting matrix as explained above, and correspondingly thereto a new bimetal pin 3 is supplied to the pre-upsetting station in the manner also already explained above. This effects a continuous operation in which during each operating stroke a bimetal pin is produced, supplied to the pre-upsetting station, there converted into a blank, and each blank introduced into the finish-upsetting station is converted into a finished metal contact.

FIG. 8 shows such bimetal contacts constructed as welding contacts, which are welded from two wire pieces and so shaped that the entire surface of the carrier layer of e.g. iron is coated with a covering of e.g. noble metal forming the contact surface. This coating may be planar or arched, depending upon the shape of the end face of the form stamp 17. According to the shape of the end face of the finish-upsetting needle 9 the carrier layer may be planar or provided with one or more welding nipples, so as to assure—depending upon the application of the bimetal contacts—their good weldability to e.g. contact springs.

I claim:

1. Apparatus for making bimetallic button contacts, particularly bimetallic welding contacts by butt-welding metal wires having different electrical conductivity to one another by eletrical resistance welding at a connecting point without noticeable deformation of the connecting point, comprising: a welding and severing station to butt-weld wires brought in contact with their end faces to produce bimetallic pins by shearing off wire components at both sides of the connecting point, a pre-upsetting station for forming the bimetallic pins into blanks; a finish-upsetting station to form the blanks to final bimetallic contacts; means for engaging the bimetallic pins in said welding and severing station after the shearing-off of the wire components and for subsequent supply to said pre-upsetting station under maintenance of a position predetermined by said welding and severing station; means for transferring the blanks into said finish-upsetting station under maintenance of a position in which said blanks come from the pre-upsetting station; supply devices operating in time with one another as well as with the welding and severing station and with forming tools of the upsetting stations; said upsetting stations each comprising an upsetting matrix with a central recess, a form stamp insertable into said recess during the upsetting operation, and an upsetting needle, the upsetting needles being axially movably received in guide bores extending coaxially to form stamps through the upsetting matrices; a guide rail located at the side of the upsetting matrix facing toward the form stamps or supply means for transferring blanks from said pre-upsetting station to said finish upsetting station, said guide rail having through bores registering with recesses in the upsetting matrices, during upsetting said form stamps engaging tools received in the recesses by said bores, said guide rail being movable to and fro in strokes corresponding to the distance between the upsetting stations so that during each movement in direction towards the finish-upsetting matrix a blank lifted out of a recess of the pre-upsetting matrix is taken along in a bore penetrated during upsetting by the pre-upsetting form stamp via a recess of the finish-upsetting matrix and thereby enters into the same.

2. Apparatus for making bimetallic button contacts, particularly bimetallic welding contacts by butt-welding metal wires having different electrical conductivity to one another by electrical resistance welding at a connecting point without noticeable deformation of the connecting point, comprising: a welding and severing station to butt-weld wires brought in contact with their end faces to produce bimetallic pins by shearing off wire components at both sides of the connecting point, a pre-upsetting station for forming the bimetallic pins into blanks; a finish-upsetting station to form the blanks to final bimetallic contacts; means for engaging the bimetallic pins in said welding and severing station after the shearing-off of the wire components and for subsequent supply to said pre-upsetting station under mainteneance of a position predetermined by said welding and severing station; means for transferring the blanks into said finish-upsetting station under maintenance of a position in which said blanks come from the pre-upsetting station; supply devices operating in time with one another as well as with the welding and severing station and with forming tools of the upsetting stations; said upsetting stations each comprising an upsetting matrix with a central recess, a form stamp insertable into said recess during the upsetting operation, and an upsetting needle, the upsetting needles being axially movably received in guide bores extending coaxially to form stamps through the upsetting matrices; said means for engaging the bimetallic pins in the welding and severing station and for subsequent supply to the pre-upsetting station including a transport blade with a cooperative transversely movable rod receiving the bimetallic pins between them and moving said pins subsequent to severing of the wire components to a side of the pre-upsetting matrix remote from the form stamp into a position between the guide bore extending through the pre-upsetting matrix and the pre-upsetting needle withdrawn from the latter, whereupon the pre-upsetting needle advances and inserts the respectively supplied bimetallic pin through the guide box into a recess for subsequent deformation into a blank.

3. Apparatus according to claim 2, wherein a sleeve is arranged on a side of the pre-upsetting matrix remote from the form stamp, said sleeve having a recess into which the bimetallic pins are inserted via the transport blade and cooperating rod precisely centrically to the guide bore in the pre-upsetting matrix.

* * * * *